United States Patent [19]
Callegari et al.

[11] Patent Number: 6,061,114
[45] Date of Patent: May 9, 2000

[54] ALIGNMENT OF LIQUID CRYSTAL LAYERS

[75] Inventors: Alessandro Cesare Callegari, Yorktown Heights; Praveen Chaudhari, Briarcliff Manor; James Patrick Doyle, Bronx; James Andrew Lacey, Mahopac; Shui-Chin Alan Lien, Briarcliff Manor; Sampath Purushothaman, Yorktown Heights, all of N.Y.; Mahesh Govind Samant, San Jose, Calif.; James L. Speidell, Poughquag, N.Y.; Joachim Stohr, Redwood City, Calif.

[73] Assignee: International Business Machines Corporation, Armonk, N.Y.

[21] Appl. No.: 09/027,997

[22] Filed: Feb. 23, 1998

[51] Int. Cl.$^7$ .......................... G02F 1/133; G02F 1/1337; G02F 1/141

[52] U.S. Cl. .......................... 349/125; 349/123; 349/134; 349/31

[58] Field of Search .................................. 349/123, 125, 349/134, 31, 126

[56] References Cited

U.S. PATENT DOCUMENTS

| | | | |
|---|---|---|---|
| 4,153,529 | 5/1979 | Little et al. | 349/125 |
| 5,013,139 | 5/1991 | Kaganowicz et al. | 349/123 |
| 5,030,322 | 7/1991 | Shimada et al. | 349/125 |
| 5,523,587 | 6/1996 | Kwo | 349/138 |

*Primary Examiner*—William L. Sikes
*Assistant Examiner*—Dung Nguyen
*Attorney, Agent, or Firm*—Merchant & Gould P.C.

[57] ABSTRACT

Bombardment of the surface of a substrate with a film layer is used to create alignment layers for liquid crystal displays. By using bombardment of the surface at an angle, both direct creation of the alignment layer or indirect deposition of the alignment layer material onto a glass plate can be achieved.

20 Claims, 7 Drawing Sheets

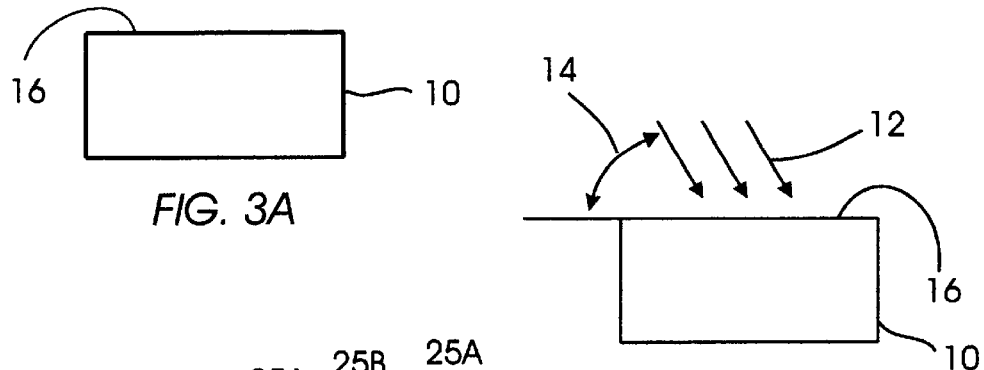
FIG. 3A
FIG. 3B
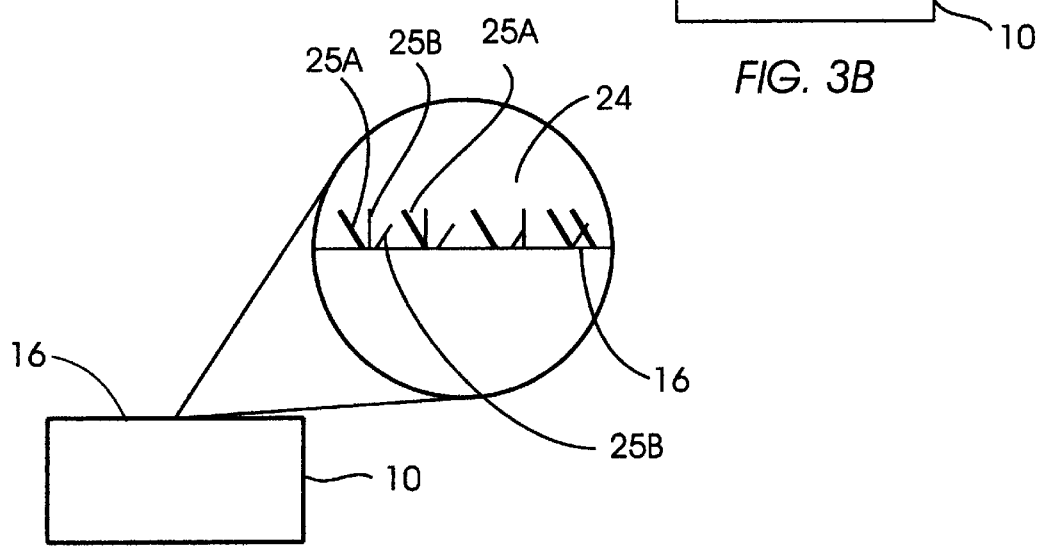
FIG. 3C
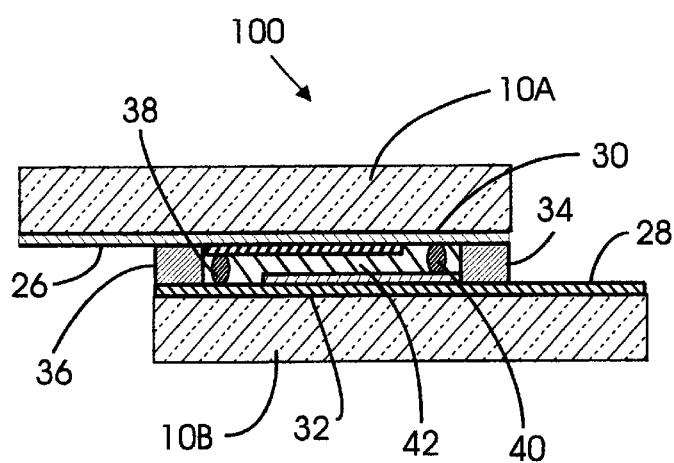
FIG. 4

ALIGNMENT OF LIQUID CRYSTAL LAYERS

CROSS-REFERENCE TO RELATED APPLICATIONS

This application is related to application Ser. No. 09/028,018, entitled "DRY PROCESSING FOR LIQUID-CRYSTAL DISPLAYS USING ATOMIC BEAM ALIGNMENT," Attorney's Docket No. YO997-383, filed same date herewith, by Alessandro Callegari et al., which application is incorporated by reference herein.

BACKGROUND OF THE INVENTION

1. Field of the Invention

This invention relates in general to liquid crystal displays, and in particular to the structure of materials and preparation methods for the alignment of liquid crystal material which can be used to form a liquid crystal display (LCD) cell.

2. Description of Related Art

Liquid Crystal (LC) displays are used in various applications, e.g., video screens, Automatic Teller Machines (ATMs), laptop computers, etc. However, the processes and materials used to make LC flat panel displays are limited.

Presently, mechanical rubbing or buffing techniques are used on polyimide films to provide an alignment surface to accept the liquid crystals. Other methods and materials can also create LC alignment layers, e.g., stretching a polymer, a Langmuir-Blodgett film, a grating structure produced by microlithography, oblique angle deposition of SiOx, and polarized UV irradiation of a polymer film. All of these methods are very expensive and time consuming and have not achieved completely satisfactory results. Most processes contain a large number of processing steps, which creates more possibility for error, lower device yields, and increases in fabrication time and device cost.

All mechanical rubbing methods have limitations. Some drawbacks arise from the mechanical contact of a rubbing cloth with the surface of the polyimide film. For example, uneven pressure and the varying directionality of the rubbing contacts with the polymer surface lead to non uniformities in the alignment layer. Further, mechanical rubbing methods introduce contamination on the rubbed surface and therefore require cleaning the surface with detergents or solvents. This contamination is also not suitable for a cleanroom environment and requires a special room within the cleanroom to produce the alignment layer, adding a significant cost to manufacturing.

The mechanical rubbing method has limitations in that it is not applicable with a structured surface and it is difficult to implement multidomain and wide viewing angle technology. Further, if a post spacer is incorporated for maintaining an equal spacing between the two plates, mechanical rubbing will cause a shadow effect.

A controllable non-contact method is preferable over the present methods described above because larger viewing angles can be achieved. Further, LC images, in terms of both retention and creation, would be more uniform across the length and width of the display. Also, mechanical methods are time-consuming and costly.

It can be seen, then, that there is a need for a non-contact method for aligning liquid crystals. It can also be seen that there is a need for a low-cost method for creating liquid crystal displays. It can also be seen, then, that there is a need for a method that uses non-polymeric materials for alignment layers.

SUMMARY OF THE INVENTION

To overcome the limitations in the prior art described above, and to overcome other limitations that will become apparent upon reading and understanding the present specification, the present invention discloses non-contact methods for creating alignment layers and liquid crystal displays, and multiple apparatuses created thereby.

A method in accordance with the present invention comprises the steps of "bombarding" a surface of a film with a directional particle beam, wherein the bombarding process creates preferentially oriented bonds on the surface of the film, and placing at least one liquid crystal on the bombarded surface. Throughout this application, the term "bombarding" shall refer to all processes where a surface is exposed to a particle beam consisting of atoms, molecules, or clusters with neutral or ionic charge.

An object of the present invention is to create an alignment layer with improved properties without mechanical contact. Still another object of the present invention is to create LC displays at a lower cost.

BRIEF DESCRIPTION OF THE DRAWINGS

Referring now to the drawings in which like reference numbers represent corresponding parts throughout:

FIGS. 3A–3C illustrate the creation of an alignment layer based on the method illustrated in FIGS. 1 and 2;

FIG. 4 illustrates a liquid crystal display cell of the present invention;

DETAILED DESCRIPTION OF THE PREFERRED EMBODIMENT

Dry Processing For Liquid-Crystal Displays Using Atomic Beam Alignment

Before proceeding with a detailed description of the present invention, it is well to define certain terms to be used herein. The term dry processing technique will hereinafter refer to any non-aqueous gaseous environment deposition process by which a film can be deposited on a substrate, such as evaporation sputtering, ion beam deposition, chemical vapor deposition, plasma enhanced chemical vapor deposition (PECVD) and so forth. The term dry processed film refers to any film that is deposited using a dry processing technique.

The present invention relates to an improved method of forming and aligning an alignment film on transparent substrates of LCDs. The present invention employs a dry processing technique, such as PECVD, to deposit an amorphous alignment film on the transparent substrates. The present invention also aligns the atomic structure of the dry processed alignment film in at least one desired direction through use of an atomic beam device. Such an arrangement provides a dry processed alignment film which is comparable in performance to polyimide films of the prior art, but does not require the additional steps of applying a wet coat of the film material, baking the wet coat to form the film, running the film through rollers, rubbing the film and cleaning the film. Moreover, such an arrangement also provides a faster and more low cost method of depositing and aligning the alignment films, than the prior art.

Figure 7:
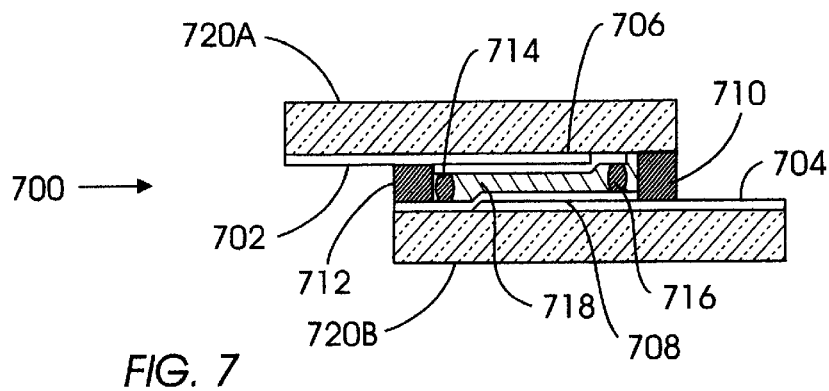
FIG. 7 illustrates a liquid-crystal cell of an LCD, in accordance with the present invention.

Referring to FIG. 7, a liquid-crystal cell 700 includes a pair of substrates, preferably glass plates, 720A and 720B which serve as a twisted nematic cell. Liquid-crystal cell 700 further includes transparent electrodes 702 and 704 located on respective substrates 720A and 720B; dry processed alignment films 706 and 708: sealing resin 710 and 112; spacers 714 and 716 (i.e., glass beads or plastic sphere) and twisted nematic liquid-crystal 718. Substrates 720A and 720B can be bonded together with the use of an adhesive, such as glue. It is preferred that the alignment film surfaces of substrates 720A and 720B are separated from each other by a space of approximately 5 $\mu$m, by spacers 714 and 716. Liquid crystal 718 is sandwiched between alignment layer 706 and 708.

The components of nematic liquid-crystal cell 700 are generally known in the art, except for the particular material of alignment films 706 and 708 and the process by which the films are deposited on respective substrates 720A and 720B, both of which are described in detail below.

Various types of films may be employed in conjunction with dry processing techniques to form alignment films suitable for use in LCDs. However, in order for a film to be suitable for use in LCDs, the film must be optically transparent and amorphous or fine stained. The term amorphous means that the atomic structure of the film has no preferred direction or orientation.

Based on the above factors, it has been discovered that the following film materials can be employed to form a suitable alignment film: hydrogenated diamond-like carbon (DLC). amorphous hydrogenated silicon, SiC, $SiO_2$, glass, $Si_3N_4$, $Al_2O_3$, $CeO_2$, $SnO_2$ and $ZnTiO_2$. These materials can be used to form alignment films that, at a minimum, are comparable to polyimide films of the prior art, but that require fewer steps and less cost to manufacture. It should be understood that any type of film material may be used so long as the formed film is optically transparent, particularly in the visible spectrum.

In the preferred embodiment, alignment films 706 and 708 are formed of hydrogenated DLC. The hydrogenated DLC film is preferably deposited using a PECVD process, and is aligned using an atomic beam that is scanned in a predetermined direction. That is, an atomic beam is employed to arrange or align the atomic structure of the alignment film in at least one desired direction such that, when an LCD, is formed, the liquid crystal molecules orient to the predetermined direction of the alignment films. The preferred embodiment is described in detail below with reference to FIGS. 8 and 9.

Figure 8:
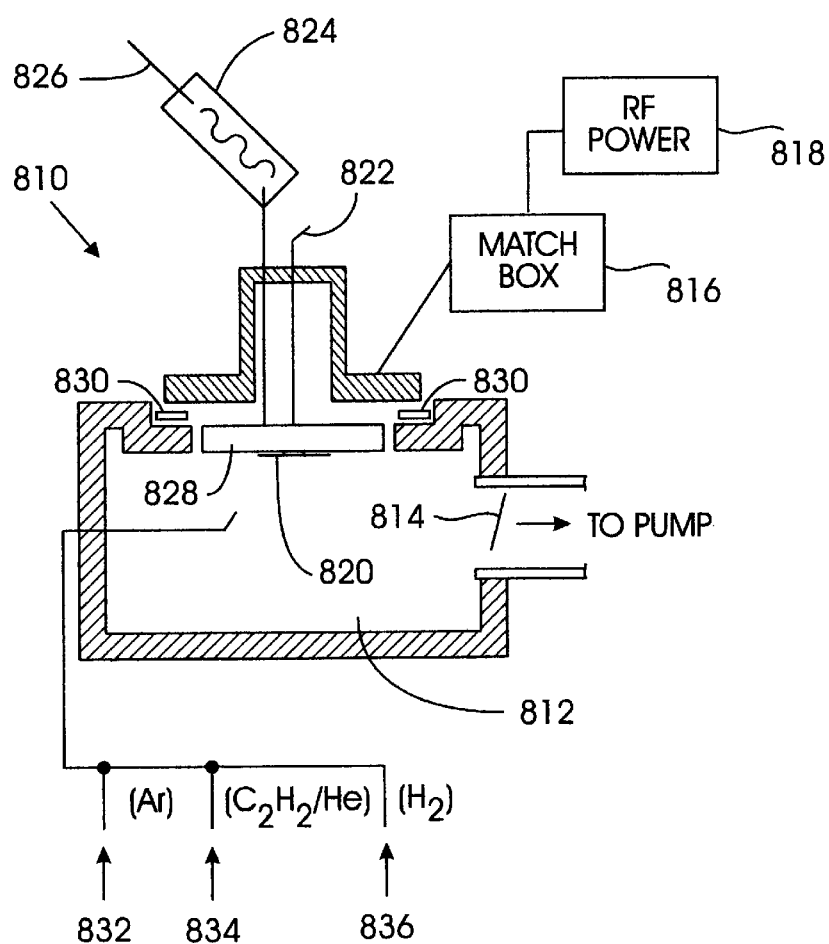
FIG. 8 illustrates a diagram of a plasma enhanced chemical vapor deposition (PECVD) device for depositing an alignment film of an LCD, in accordance with the present invention.

Referring to FIG. 8, there is shown a preferred PECVD processing apparatus 810, for depositing an alignment film, such as hydrogenated DLC, on a substrate 720. Apparatus 810 includes a reactor chamber 812 having a throttle valve 814 which separates reactor chamber 812 from a vacuum pump (not shown). A cathode 828 is mounted to reactor chamber 812 and is isolated therefrom by a dielectric spacer 830. Cathode 828 is provided with a heater 824, an inlet of $N_2$ gas 826 and an exhaust for $N_2$ gas. Substrate 720 is attached to an inner end of cathode 828. Cathode 828 is electrically connected to a radio frequency (RF) source 818 which may be regulated, and the impedance between cathode 828 and RF source 818 is matched by utilizing an impedance matching device 816.

Reactor chamber 812 also includes conduits 832 and 834 which introduce various materials into reactor chamber 812. For example, pre-mixed hydrocarbon helium gas mixture (i.e., $C_2H_2$/He) and hydrogen ($H_2$) can be introduced into reactor chamber 812 through conduit 834 and 836, respectively, while argon (Ar) gas for cleaning substrate 720 is introduced through conduit 832.

To form a hydrogenated DLC alignment film, the hydrocarbon gas may be any hydrocarbon compound which is first capable of being gaseous and is able to form a plasma at the reaction conditions employed by the present process. The term hydrocarbon implies that the molecules which make up the compound contain carbon and hydrogen atoms. The present process may also utilize saturated or unsaturated hydrocarbon compounds. By definition, a saturated hydrocarbon compound is a compound whose molecules contain only carbon single bonds, while an unsaturated compound is a compound whose molecules contain carbon double or triple bonds.

It is preferred that the hydrocarbons are alkanes, alkenes and alkynes. An alkane is defined herein as a compound whose molecules contain only single bonds between carbon atoms, such as methane, ethane, propane, butane and the like thereof. Alkenes are defined herein as compounds whose molecules contain a carbon-carbon double bond, such as ethene, propene, n-butene and the like thereof. Finally, an alkyne compound is defined herein as a hydrocarbon whose molecules contain a carbon-carbon triple bond, such as acetylene, propyne, 1-butyne, 2-butyne and the like thereof. However, it should be noted that mixtures of hydrocarbon gases, such as acetylene/methane, may also be employed to form the alignable DLC alignment film of the present invention.

In order to obtain an hydrogenated DLC alignment film with high thermal stability, the hydrocarbon gas is preferably diluted with helium. The term diluted is defined herein as such admixture of a hydrocarbon (i.e., $C_2H_2$) with helium, such that the final concentration of the hydrocarbon in the admixture constitutes preferably from about 0.5% to about 90% of the admixture. It is also preferred that the hydrocarbon is diluted with helium such that the final concentration of hydrocarbon in the admixture is from about 2% to about 50%.

Gases employed by the present invention have a purity greater than about 95.5%, but preferably in the range from about 98.5% to about 99.99%. The high purity gases are pre-mixed in the same gas cylinder before being introduced in reaction chamber 812. The gas mixture is introduced into reaction chamber 812 by first passing it through a flow controller at a sufficient flow to provide a total pressure of hydrocarbon and helium from about $1\times10^{-3}$ Torr to about $600\times10^{-3}$ Torr. It is preferred that the pressure of hydrocarbon helium mixture be about $20\times10^{-3}$ Torr to $200\times10^{-3}$ Torr. The above conditions can also be obtained by introducing each gas separately through flow controllers providing the desired partial pressures.

Substrate 720 (generally denoting substrates 720A and 720B of FIG. 7) can be a transparent material, such as glass, plastic or any material suitable for use in a LCD cell. Substrate 720B (FIG. 7) can also be a nontransparent material, such as Si-based substrate for reflective display panels. Substrate 720 is mounted on a RF cathode 828 inside reaction chamber 812 of PECVD apparatus 8. Reaction chamber 812 is then tightly sealed and evacuated until a partial pressure reading of preferably about $1\times10^{-5}$ Torr or below is obtained. After evacuating reaction chamber 812 to a desired pressure range, substrate 720 is preferably maintained at room temperature 24° C.

Depending on the type of substrate used, the material may or may not be subjected to in-situ plasma cleaning prior to depositing the diamond-like carbon film. However, if desired the following cleaning techniques may be employed, such as $H_2$, Ar, $O_2$ and $N_2$ plasma sputter etching techniques. In the present case, it is preferred that substrate 720 is precleaned for about 1.0 minute in an Ar plasma at a pressure of about $5\times10^{-3}$ Torr and a RF power density of approximately 0.31 $W/cm^2$.

After achieving and maintaining the desired temperature, the admixed gas is introduced into reaction chamber 812 at an appropriate flow rate, preferably about 10 to 100 sccm. The admixture is introduced into reaction chamber 812 at an appropriate pressure, preferably about $1\times10^{-3}$ Torr to $1000\times10^{-3}$ Torr. In the preferred embodiment, the gases are introduced in reactor chamber 812 at a flow of about 25 sccm for the hydrocarbon mixture (i.e., acetylene/helium or $C_2H_2$/He) and about 15 sccm, for the $H_2$ gas.

In order to obtain a plasma of the gas mixture, the cathode bias is held fixed at an appropriate voltage depending on the gas mixture. It is preferred that the voltage is from about $-20$ V to $-300$ V, but more preferably at about $-125$ V, throughout the deposition process. This voltage is supplied to RF cathode 828 by using an RF choke-isolated DC power supply source. To minimize damage to substrate 720 during the deposition process, a low RF power density should be utilized. Typically, this involves applying an RF power density from about 3 to 20 $mW/CM^2$, preferably about 15 $mW/cm^2$.

The hydrogenated DLC alignment film is then deposited onto substrate 720 at a rate, such that an essentially continuous coating of the film on the substrate is obtained. By employing the above-mentioned operation parameters, the hydrogenated DLC alignment film can be deposited onto the substrate at a rate of about 5 Å/min to 10,000 Å/min.

In accordance with the present invention, the hydrogenated DLC alignment film deposited on the substrate can range from about 10 to 10,000 Å thick, preferably from about 10 to 100 Å thick. The optical transparency of the hydrogenated DLC alignment film can be controlled by varying the resultant thickness. Thus, the optical transparency of the hydrogenated DLC alignment film can be varied by merely increasing or decreasing its thickness. For example, a thickness of approximately 60 Å is sufficient for obtaining over 90% transmittance through the visible spectrum.

Hydrogenated DLC alignment films deposited in accordance with the process of the present invention are characterized as being amorphous, thermally stable, electrically insulating and optically transparent. Additionally, the hydrogenated DLC alignment films deposited by PECVD from a hydrocarbon/helium gas mixture have a dielectric strength comparable to that normally associated with diamond films. The diamond-like carbon film deposited from a hydrocarbon/helium gas mixture in accordance with the present invention has a dielectric strength close to 10 MV/cm.

Figure 9:
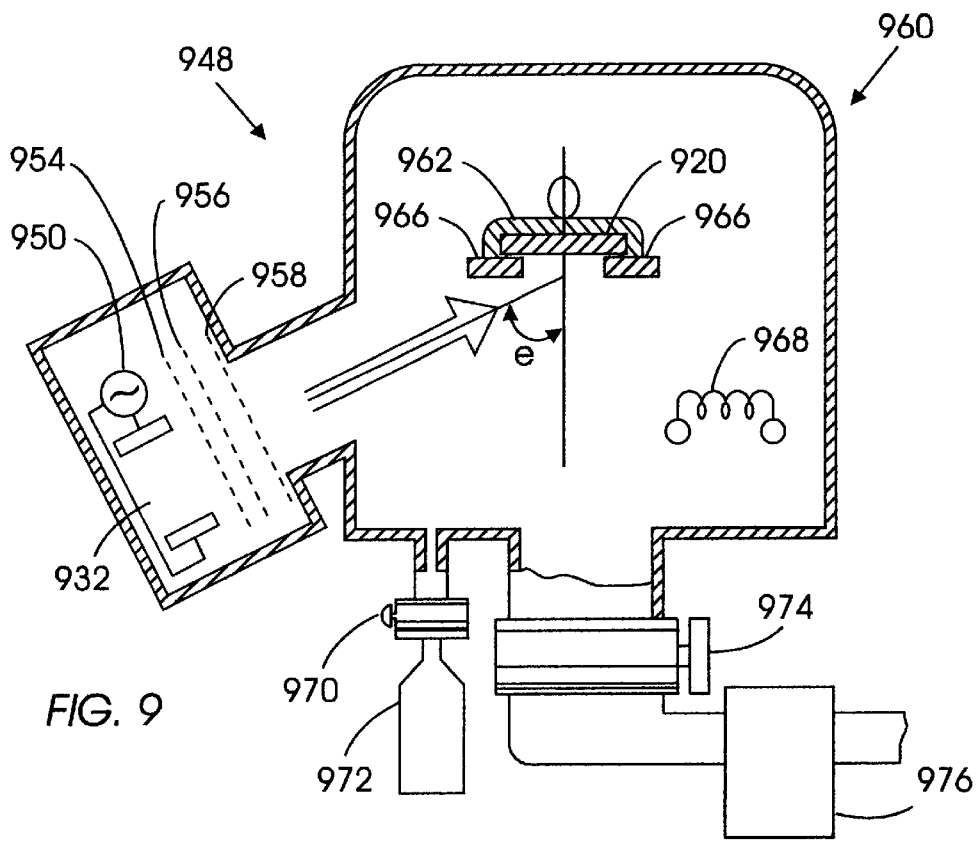
FIG. 9 illustrates a diagram of an atomic beam alignment device for orienting a dry processed alignment film of FIG. 2, in accordance with the present invention.

Referring to FIG. 9, there is provided an atomic beam alignment device 948 for aligning an atomic structure of an alignment film (e.g., hydrogenated DLG film) in at least one desired direction or orientation through the use of ion radiation. As is generally understood the alignment film serves to orient the direction of the liquid-crystal. That is, when a liquid cell is formed, the molecules of the liquid-crystal align along the direction(s) provided by the atomic structure of the alignment films. Accordingly, atomic beam 948 can be used to radiate ions at the alignment film to disturb (i.e., to break bonds) and align the atomic structure of the alignment film in a desired direction or orientation, such as in a horizontal, unidirectional or multidirectional manner. A mask with features etched into it can also be used to selectively align a local area, thus leading to the fabrication of domains of alignment. These can then be used to fabricate a multidomain display, which has vastly superior viewing attributes. For multidirectional alignment, it is preferred that the multidirections are selected in such a fashion that results in a multidomain device.

As shown in FIG. 9, atomic beam device 948 includes a bell jar 60, an alternating current (AC) or direct current (DC) power source 950 and a group of three electrodes. The three electrodes include an accelerating electrode 954, a pulling electrode 956 and an earth electrode 958 through which ions are extracted that are generated by plasma generating unit 952. Although three electrodes are described above, the present invention may also utilize two electrodes to generate a beam of atoms, (e.g., a two-gridded ion optic set). Atomic beam device 948 further includes a plate fixing platform 962 located within bell jar 960; substrate 720 fixed on plate fixing platform 962 and having an alignment film thereon; a neutralization filament or device 968 (positioned in the path of the atomic beam) or the equivalent thereof; and a gas flow rate control unit 970. Atomic beam-device 948 may further include a mask 966 covering the surrounding of substrate 920.

Plasma generating unit 952 serves to generate ions with the group of three electrodes 954, 956 and 958 extracting ions and irradiating substrate 720. Gas supply 972 is connected to the vacuum chamber 960 through a gas flow controller 970. Substrate 720 is fixed on plate fixing platform 962 in a manner to maintain an angle θ which is the angle of incidence of the accelerated grains with respect to a line that is normal to substrate 720. The angle θ preferably ranges from about 20° to 80°.

In operation, vacuum pump 976 serves to evacuate bell jar 960, through a valve 974, preferably to an extent of $1\times10^{-5}$ Torr to $2\times10^{-5}$ Torr. Thereafter, a gas is introduced to bell jar 960 through gas flow rate control unit 970. The gas may be a noble or inert gas, such as helium (He), argon (Ar), Neon (Ne), krypton (Kr) or Xenon (Xe); an admixture of a noble gas with an active gas, such as nitrogen, fluorine, a fluorocarbon, or a hydrocarbon, nitrogen: oxygen; or combinations thereof. Plasma generating unit 952 is then operated at an appropriate pressure, preferably at about $1\times1^{-4}$ Torr to 1×10⁻⁵ Torr, so that the introduced gas enters into a plasma state. An appropriate voltage, preferably about 75 V to 200 V, is then applied to accelerating electrode 954 which serves to apply kinetic energy to the ions extracted from the plasma.

It should be noted that the orientation or direction of the alignment film can be adjusted by selecting an appropriate angle of incidence θ, voltage applied to the accelerating electrode, amount of exposure time and so forth. The alignment film of substrate 720 is preferably exposed to the aligning ion radiation for about 5 seconds to 2 minutes for DLC films.

However, it should be noted that the radiating ions may cause charge to collect on the alignment film. Since the alignment film serves as an insulating layer, neutralization filament or device 968 or the equivalent thereof (such as a plasma bridge neutralizers or hollow cathodes) is employed to emit thermal electrons to neutralize the ions. This design allows an array of non-linear display elements, such as TFT or MIM, to be present on the substrate, since it does not generate such static electricity as to damage the non-linear elements.

Although the step of depositing the film and the step of aligning the film are described above as being performed in separate chambers, it should be understood that both steps may be performed in the same chamber, room or location. It is also important to understand that the above process may be employed with dry processing techniques other than PECVD. The alignment film may also be a dry processed film other than hydrogenated DLC, such as amorphous hydrogenated silicon, carbon nitride, boron nitride, SiC, $SiO_2$, glass, $Si_3N_4$, $Al_2O_3$, $CeO_2$, $SnO_2$ and $ZnTiO_2$ or any other dry processed film suitable for use in LCDs. Any type of dry processed film may be employed so long as it is optically transparent (particularly in the visible spectrum), and amorphous or fine-grained. It should also be understood that the step of depositing the film and the step of aligning the film is applicable both to transparent substrates for transmissive displays or transmissive light valves, and to the transparent substrate combined with a non-transparent substrate for reflective displays or reflective light valves.

Display Characteristics of DLC Film

Various experiments were conducted on hydrogenated DLC film to determine its suitability as an alignment film. The experiments were performed to ascertain whether DLC alignment films provided the necessary display characteristics required of alignment films. The display characteristics include optical transparency electrical insulating quality, pretilt angle, anchoring energy, charge retention, quality of a gray scale in an LCD and image deterioration. Through such experimentation, it was determined that dry processed hydrogenated DLC film provides comparable performance to wet coated polyimide films of the prior art. The results of the experiments are discussed below with reference to FIGS. 10 through 13 and Table I.

TABLE I

Transmission Percentage of DLC alignment film on Glass/ITO Plate

| | Hydrogen Content | WAVELENGTH (nm) | | |
| --- | --- | --- | --- | --- |
| | | 620 nm | 540 nm | 450 nm |
| 40 Å, Standard DLC | 26.0% | 96.16% | 93.92% | 90.12% |
| 40 Å, Hydrogenated DLC* | 30.0% | 98.62% | 97.67% | 95.76% |
| 50 Å, Hydrogenated DLC* | 30.0% | 97.81% | 96.36% | 93.58% |
| 75 Å, Hydrogenated DLC* | 30.0% | 98.38% | 94.46% | 90.78% |

* the tested hydrogenated DLC alignment film has an approximately 30% hydrogen content.

With regard to optical transparency the optical transmission characteristic of DLC alignment films were examined as a function of thickness and hydrogen content. Table I shows that by increasing the hydrogen (H) content, the optical transmission also increases. This information is provided in Table I. As shown in Table I, transmission percentages for hydrogenated DLC alignment films are well above 90% in the visible spectrum. Hydrogenated DLC films are thus optically transparent and are suitable for use as an alignment film of a LCD cell. The diamond-like carbon structure of hydrogenated DLC films also provides a film that is electrically insulating.

Figure 10:
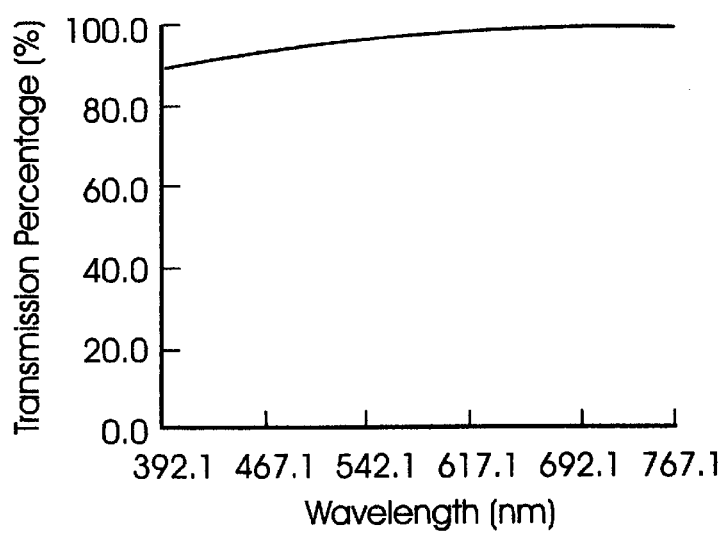
FIG. 10 illustrates a graph of transmission versus wavelength for a hydrogenated DLC film of the present invention.

For a standard DLC alignment film (i.e., with a hydrogen content of about 26%) having a 40 Å thickness, the transmission percentage of a 630 nm wavelength is about 96.16%, of a 540 nm wavelength is about 93.92%, and of a 450 nm wavelength is 90.12%. As shown in Table I, at higher hydrogen content DLC films have an increased transmission percentage over a standard DLC with the same thickness. In particular, hydrogenated DLC with a thickness of 40 Å and a hydrogen content of about 30% has a transmission percentage of 98.62% for a 620 nm wavelength, 97.67% for a 540 nm wavelength, and 95.76% for a 450 nm wavelength. Hydrogenated DLC films with a thickness of about 50 Å and 75 Å also have improved optical characteristics over the above standard DLC with a smaller thickness and lower hydrogen content. A graph of the transmission percentage versus the wavelength for hydrogenated carbon film with a 50 Å thickness is shown in FIG. 10. The transmission percentage of a 50 Å hydrogenated DLC film is about 90% for a wavelength of 392.1 nm and increases with the wavelength.

Accordingly, thicker alignment films can be employed with suitable optical transparency by either increasing the hydrogen content (as in this case) or adding another element. In this way, thicker alignment films may be employed without sacrificing the optical characteristic of the film. Such an arrangement thus provides greater design flexibility in the manufacturing of LCD cells.

Figure 11:
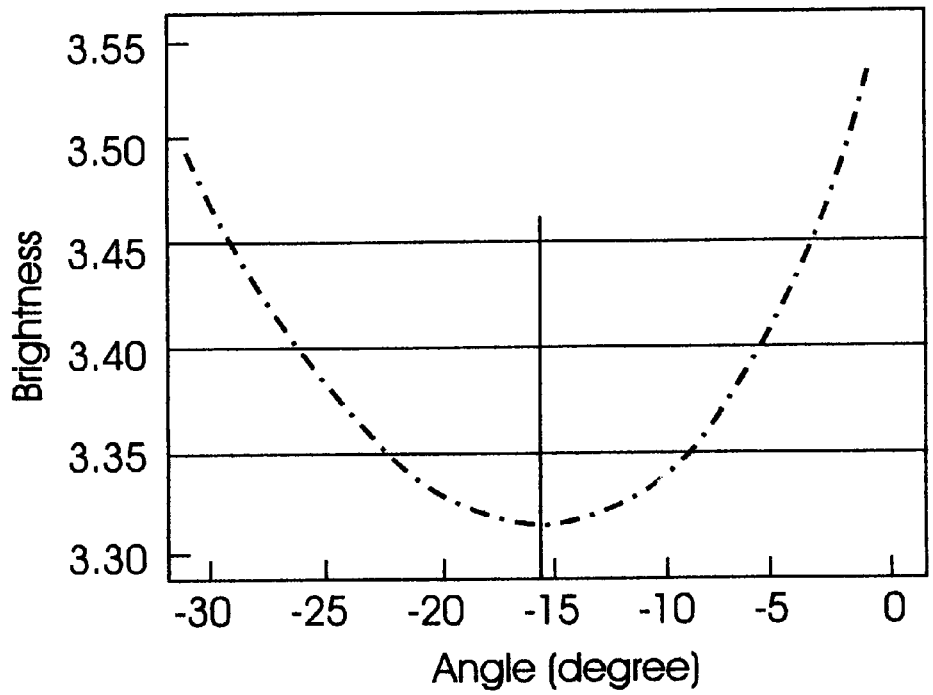
FIG. 11 illustrates a pretilt angle measurement graph of optical transmission versus cell rotation angle for a LCD cell with a hydrogenated DLC film of the present invention, used as the LC alignment layer.

FIG. 11 illustrates a graph of the pretilt angle of a LCD cell with a DLC alignment film. This pretilt angle is determined from optical transmission vs. cell rotation, as shown in FIG. 11. The pretilt angle relates to the angle at which the molecules of the hydrogenated DLC alignment film are naturally oriented with respect to the substrate. For good display characteristics, the pretilt angle should be greater than 2 to 2.5 degrees (°). As shown in FIG. 11, the pretilt angle of the hydrogenated DLC alignment film having a thickness of 50 Å and a hydrogen content of about 30% is at least 3.0 degrees (°) The pretilt angle can be deduced from the minimum point of the graph of FIG. 11, which, in this case, is about 3.3 degrees (°).

Measurements were also performed to determine the anchoring energy and charge retention of a hydrogenated DLC film. Anchoring energy relates to the binding strength between a liquid-crystal and an alignment film surface. If the anchoring energy is too low, the LCD cannot function properly. It is known that the anchoring energy of rubbed polyimide, about 1.4 N/m (where N=Newtons), is adequate for use in LCDs. For hydrogenated DLC films, the anchoring energy was determined to be about 2 N/m which is greater than that of the prior art films. Hydrogenated DLC films are thus viable candidates as alignment films.

With respect to charge retention, the hydrogenated DLC alignment film of the present invention was also determined to be comparable to that of rubbed polyimide film.

Figure 12:
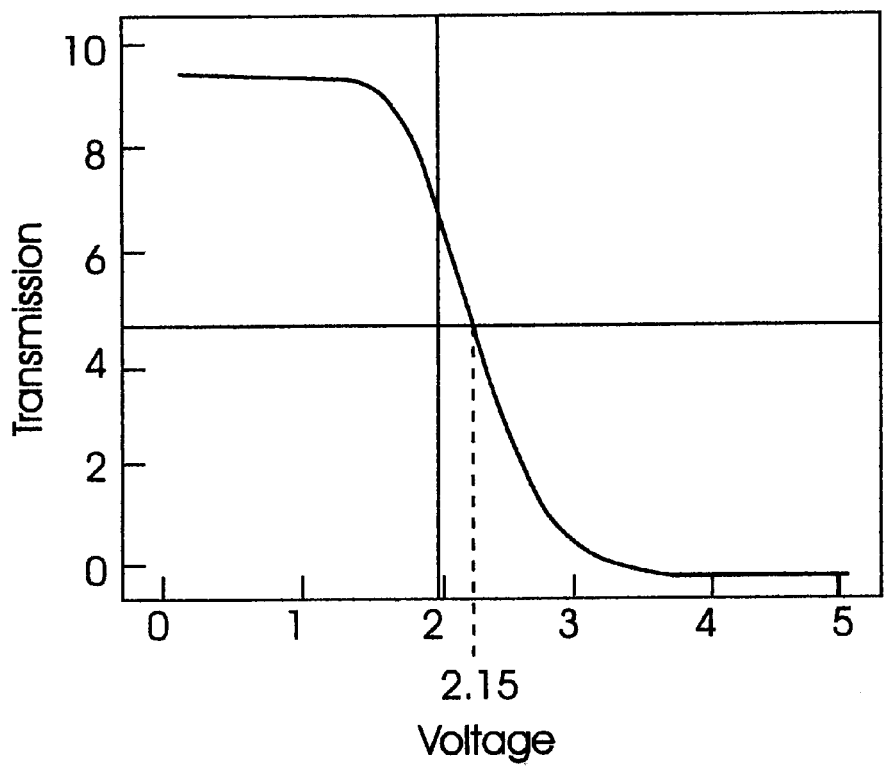
FIG. 12 illustrates a graph of the optical transmission versus voltage for a LCD cell with a hydrogenated DLC film of the present invention, used as the LC alignment layer.
Figure 13:
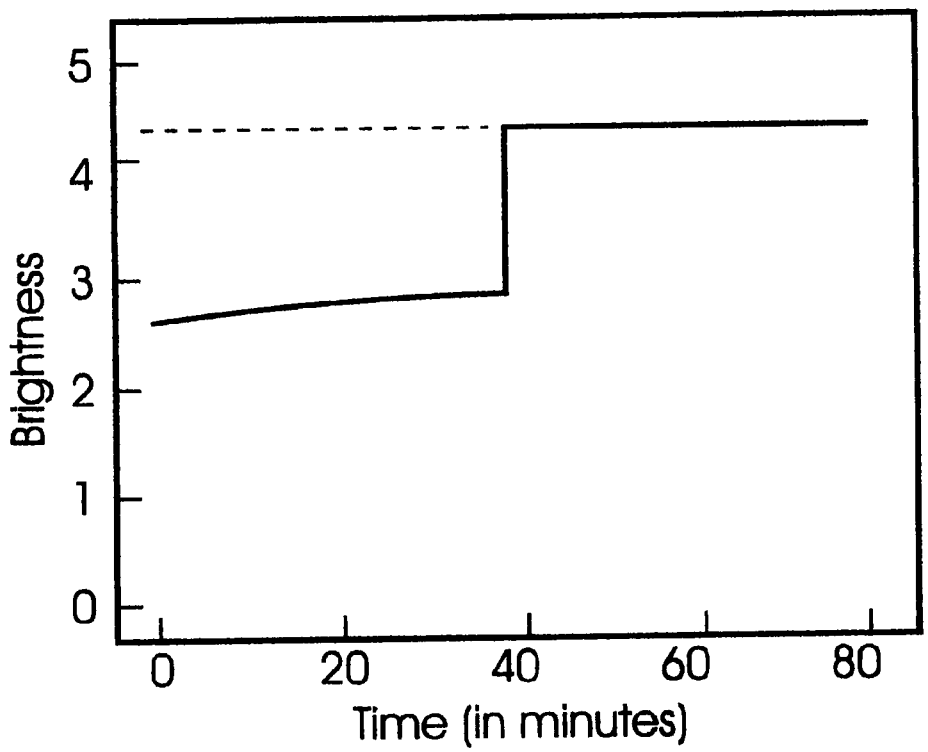
FIG. 13 illustrates a image sticking measurement graph of the optical transmission for a DLC cell with a hydrogenated DLC film of the present invention, used as the LC alignment layer.

Referring to FIG. 12, there is shown a graph of the variation of the transmission of light versus voltage to determine the quality of a gray scale in an LCD employing DLC alignment films. As shown in FIG. 12, the transmission of light gradually changes from about 1.5 V to 3.0 V with a transmission switching point at about 2.15 V. The above transmission characteristics (as shown in FIG. 12) are comparable to the best polyimide films. Therefore, hydrogenated DLC alignment films provide a gray scale quality comparable to that of the best polyimide films.

Another significant characteristic for an alignment film relates to image deterioration associated with residual voltages build up over time, when an LCD is in an ON state. This problem is commonly referred to as the image sticking problem and can be quantified in terms of brightness versus time. As shown in the graph of FIG. 7, there is no measurable sticking problem with hydrogenated DLC alignment films. That is, the brightness value of an LCD cell with hydrogenated DLC alignment films abruptly changes when turned ON or OFF (i.e., a step change) which indicates no image deterioration over time.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Overview Typically, the alignment of liquid crystals (LCs) in flat panel displays is accomplished by placing a thin film of LC on a mechanically rubbed polyimide film coated on a suitable substrate. Limitations imposed by the mechanical rubbing method, e.g., creating multiple domains for improving the viewing angle, ease of control of the LC pretilt angle, in conjunction with the difficulty of optimizing polymer materials, e.g., polymers that help reduce image sticking, make it highly desirable to use alternative materials and a non-contact LC alignment method.

Other methods and materials can also create LC alignment layers, e.g., stretching a polymer, a Langmuir-Blodgett film, a grating structure produced by microlithography, oblique angle deposition of SiOx, and polarized UV irradiation of a polymer film. All of these methods are very expensive and time consuming. Most processes contain a large number of processing steps, which creates more possibility for error, lower device yields, and increases in fabrication time and device cost.

The present invention avoids costly additional layers and processing steps as well as mechanically contacting the surface of the alignment film layer by directionally depositing the alignment layer directly onto the surface. The present invention performs this by directional deposition or by modifying the surface through implantation techniques.

One method is to directly deposit the material on the surface, while another method is to use an ion beam (typically argon) to bombard a target which then emits particles that are deposited on a second surface. Other gases that can be ionized can also be used to bombard the target. This bombardment process creates many characteristics that assist in the manufacture of LC displays.

As such, more materials are now available for use as an alignment structure for LC displays. The present invention discloses that any covalent or partially covalent material containing surface preferentially oriented bonds, e.g., glass, or those involving hydrogen, boron, carbon, silicon, aluminum, tin, chlorine, phosphorous, nitrogen, fluorine, and oxygen or other atoms, or having preferentially oriented bonds of similar materials near the surface, are acceptable materials for LC alignment.

Because of the directional nature of bonds in covalent or partially covalent materials, such materials can be modified at or near their surfaces through reorientation, destruction, or creation of new bonds to yield preferential bond alignment. Whenever an alignment on a molecular level exists on the surface, the material will align a LC placed on the surface. For mechanically rubbed surfaces in the prior art, the alignment originates from preferential chain segment alignment through unidirectional contact with the rubbing cloth fibers. However, mechanical rubbing is not completely uniform.

Ion bombardment of polymers creates anisotropic bonds near the surface by directional bond breaking and subsequent bond formation. Typical Argon ion beam irradiation of a polymer results in a thin surface layer (a few nanometers) of a largely disordered, amorphous carbon-like structure which exhibits preferential bond orientation relative to the incoming ion beam direction. In all cases, the directional molecular bonds form the template for LC alignment on the surface. Further, it is possible to use crystalline or polycrystalline materials to assist or directly create alignment layers as described in the present invention.

Preferential Bond Creation

The preferential bond alignment can be created in a number of ways. To avoid the use of a polymer film, a dry processed layer can be created by selectively depositing material to form the alignment layer.

Figure 1:
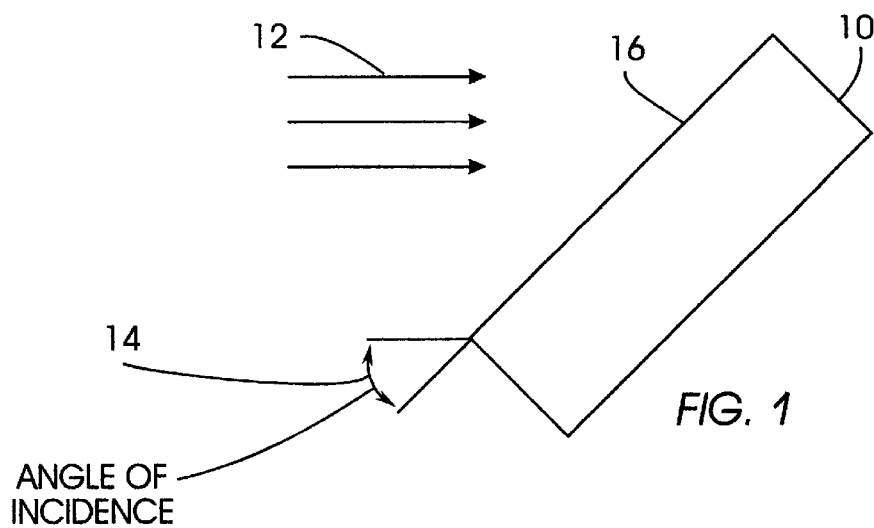
FIG. 1 shows bombarding the surface of a substrate in accordance with the present invention.

FIG. 1 shows directly depositing material on a substrate in accordance with the present invention.

Substrate 10 is exposed to an ion beam 12 at an angle of incidence 14. Angle of incidence 14 can vary from 5 to 80 degrees, and is preferentially 45+/−20 degrees. Angle of incidence 14 is more preferentially 45+/−5 degrees, and most preferentially 45 degrees.

The surface 16 of substrate 10, is typically exposed to an ion beam 12 comprised of atoms that will preferentially bond with the substrate 10 at the surface 16. This can take place by growing new material on the surface 16, or by implanting material into the substrate 10 at or near the surface 16. The material implanted can be hydrogen, boron, carbon, silicon, aluminum, tin, chlorine, phosphorous, nitrogen, fluorine, oxygen, or other molecules or ions.

Ion beam 12 can take many forms. Typically, ion beam 12 is comprised of ions as used in ion implantation, but can also be a molecular or atomic beam as used in molecular beam epitaxy or a chemical vapor as used in chemical vapor deposition.

By varying the angle of incidence 14, the surface 16 of the substrate 10 will take on various forms. The surface 16, after exposure to ion beam 14, will become an alignment layer on substrate 10. The preferred form of surface 16 after the deposition or implantation by ion beam 12 contains a plurality of preferentially oriented bonds in a given direction, which is formed by the ion beam 12 at a forty-five degree angle of incidence 14. Depending on the material deposited or implanted by ion beam 12 and the material used in the substrate 10, the angle of incidence 14 used to create the preferred embodiment may vary from forty-five degrees.

Figure 2:
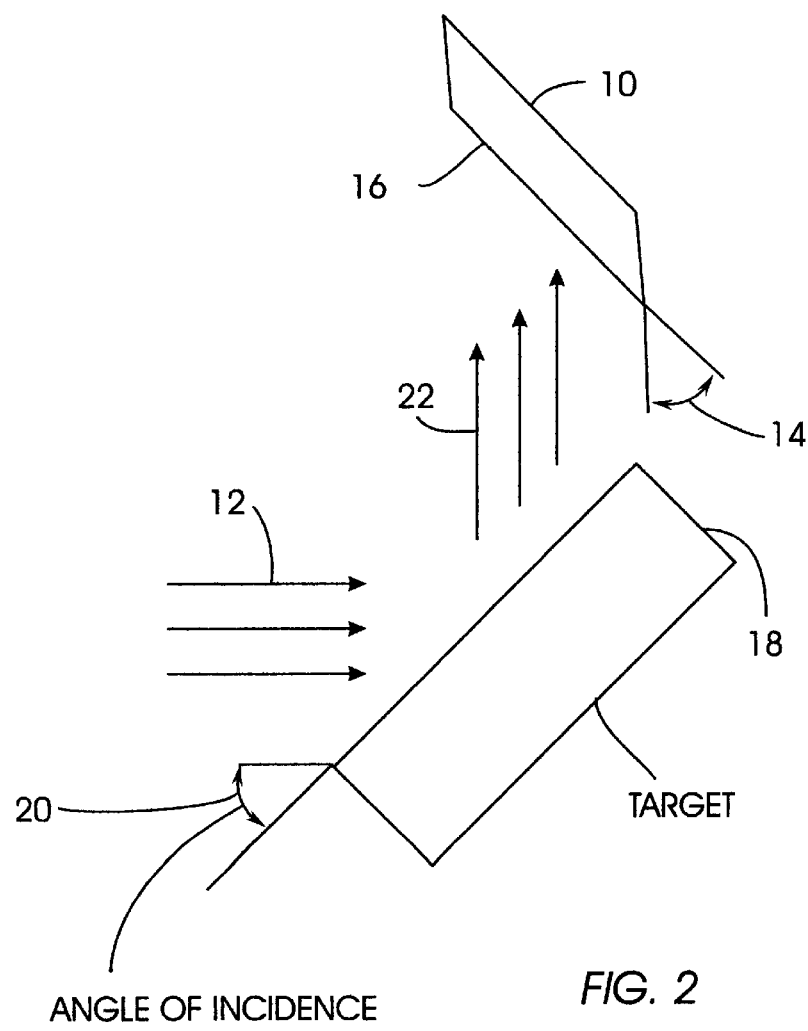
FIG. 2 illustrates an indirect deposition as embodied in the present invention.

FIG. 2 illustrates an indirect deposition as embodied in the present invention.

FIG. 2 shows target 18 being exposed to ion beam 12 at an angle of incidence 20. Where target 18 is exposed to ion beam 12, ion beam 12 is typically created using a noble gas, but can also be created by an admixture of a reactive gas with a noble gas, e.g., oxygen mixed with a noble gas, nitrogen ions mixed with a noble gas, carbon mixed with a noble gas, hydrogen mixed with a noble gas, fluorocarbons mixed with a noble gas, hydrocarbons mixed with a noble gas, and chlorine mixed with a noble gas. Further, the beam 12 can be purely reactive, comprising e.g., oxygen, nitrogen, carbon, hydrogen, fluorocarbons, hydrocarbons, chlorine, or other reactive ions.

Substrate 10 is exposed to emissions 22 that are generated by target 18 during exposure to ion beam 12. Emissions 22 strike surface 16 of substrate 10 at an angle of incidence 14. Emissions 22 are deposited on surface 16 of substrate 10. The deposition of emissions 22 creates the alignment layer on the surface 16 of the substrate 10.

In FIG. 2, an indirect method of creating the alignment layer is shown. Substrate 10 can now be any material, and the deposition of emissions 22 can be easily controlled by the strength of the ion beam 12 and the angles of incidence 14 and 20. Thus, an alignment layer can be created on the surface 16 without mechanical contact with the surface 16.

FIGS. 3A–3C illustrate the creation of an alignment layer based on the method illustrated in FIG. 1.

FIG. 3A shows a substrate 10 with a surface 16. Those skilled in the art will recognize that the surface 16 could be an additional layer of material placed on top of substrate 10.

FIG. 3B shows surface 16 being exposed to ion beam 12.

FIG. 3C shows surface 16, after being exposed to ion beam 12 or beam 22 for some period of time, having additional or modified material 24 being deposited on surface 16. Additional or modified material 24 is shown in a microscopic view, where the material 24 and bonds 25A and 25B are shown enlarged for ease of viewing. Bonds 25A and 25B are covalent or partially covalent bonds between atoms and are not visible to the human eye but their existence and preferred orientation can be detected by spectroscopic methods.

Additional material 24 is generated by beam 22 as shown in FIG. 2. Modified material 24 is generated by ion beam 12 as shown in FIG. 1. As ion beam 12 deposits material 24 on surface 16, bonds are created at the surface 16. Even though material 24 contains random bond angles, bonds 25A, for example, are slightly more prevalent than the bonds 25B in material 24. On average, the material 24 exhibits an directional anisotropy of its bonds and this anisotropy creates the ability of the material 24 to serve as an alignment layer on surface 16. The bond anisotropy depends on the angle of incidence 14 between the surface 16 of the substrate 10 and the direction of the ion beam 12.

The method shown in FIG. 2 would create additional material 24, also called emissions 22, that are deposited on surface 16 of substrate 10, similar to that shown in FIG. 3C. However, using the method shown in FIG. 2 would allow for additional materials to be used for substrate 10.

The illustrated bonds 25A and 25B can be of several forms, such as in benzene rings, molecular chains or crystalline or amorphous materials. The depiction in FIG. 3C is illustrative in nature only and is not meant to limit the materials that can be used for ion beam 12 or emissions 22.

Use Of The Alignment Layers In A Liquid Crystal Cell

FIG. 4 illustrates a liquid crystal cell manufactured in accordance with the present invention.

As shown in FIG. 4, a liquid crystal cell 100 includes a pair of substrates 10A and 10B. Substrates 10A and 10B are typically glass plates, but can be other materials that are transparent in the visible region. One of the substrates 10A or 10B can also be a non-transparent substrate.

Liquid crystal cell 100 further includes transparent electrodes 26 and 28 located on respective substrates 10A and 10B, or electrodes 26 and 28 located on respective substrates 10A and 10B where one of these substrates is non-transparent, alignment layers 30 and 32, sealing resin 34 and 36, spacers 38 and 40 (i.e., glass beads), and twisted nematic liquid crystal 42.

Preferably, the alignment layers 30 and 32 are separated by a space of approximately 5 microns by spacers 38 and 40.

The use of dry deposited materials to form the alignment layers 30 and 32 provide the ability to create precise alignment layers 30 and 32, on the substrates 10A and 10B respectively, in an efficient and simple manner. The ability to provide inexpensive alignment layers 30 and 32 that are easily produced decreases the manufacturing costs of liquid crystal cell 100 and increases the yield of liquid crystal cell 100 during manufacturing.

Figure 5:
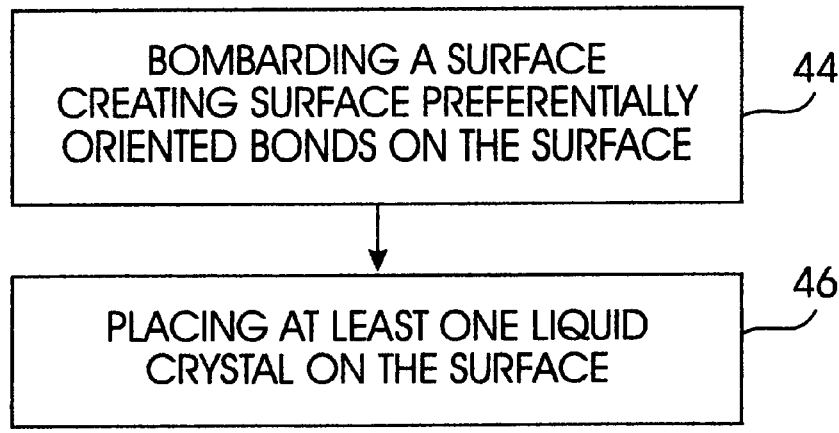
FIG. 5 is a flowchart illustrating the steps used in the present invention.

FIG. 5 is a flowchart illustrating the steps used in the present invention.

Block 44 represents the step of bombarding a surface, wherein the step of bombarding creates surface preferentially oriented bonds on the surface.

Block 46 represents the step of placing at least one liquid crystal on the bombarded surface.

Figure 6:
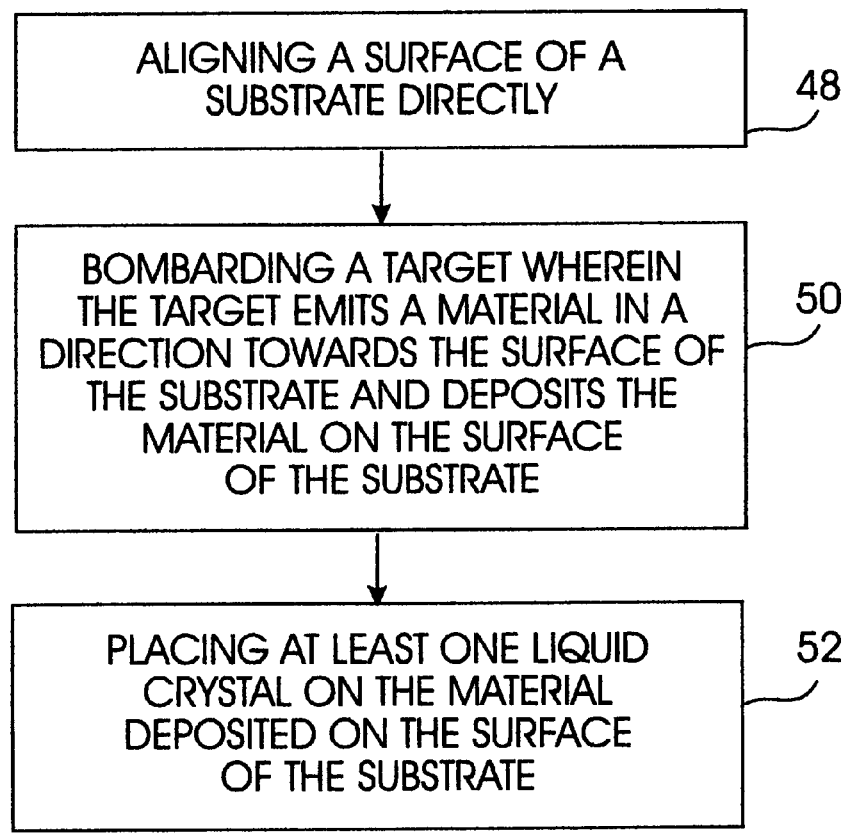
FIG. 6 is a flowchart illustrating the steps used in the present invention.

FIG. 6 is a flowchart illustrating the steps used in the present invention.

Block 48 represents the step of aligning a surface of a substrate directly.

Block 50 represents the step of bombarding a target, wherein the target emits a material in a direction towards the surface of the substrate and deposits the material on the surface of the substrate.

Block 52 represents the step of placing at least one liquid crystal on the material deposited on the surface of the substrate.

Conclusion

In summary, apparatuses and methods for creating oriented layers for aligning liquid crystals are disclosed in the present application. Bombardment of the surface with particle beams, which either directly or indirectly deposit material on the surface or implants material into the surface, creates an alignment layer used for aligning liquid crystals. The uniformity of the layer, made possible by preferentially oriented bonds at the surface of the substrate, allows the liquid crystals to be more precisely controlled. The thickness and electronic properties of the alignment layer may also be tailored for optimum performance. Further, the alignment layer is less expensive to manufacture in terms of time and cost.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating a liquid crystal alignment layer, comprising the steps of:
   creating a beam containing material to be deposited on a surface; and
   bombarding the surface with the material containing beam, whereby the material containing beam deposits an additional layer of material on the surface, the layer having, preferentially oriented bonds on the surface, wherein the step of bombarding creates the alignment layer with the oriented bonds.

2. The method of claim 1, wherein the additional layer is selected from the group consisting of hydrogen, boron, carbon, silicon, aluminum, tin, chlorine, nitrogen, fluorine, and oxygen.

3. The method of claim 1, wherein the step of bombarding is performed at a substantially non-perpendicular angle to the substrate.

4. The method of claim 3, wherein the substantially non-perpendicular angle is between ten and eighty degrees.

5. The method of claim 3, wherein the substantially non-perpendicular angle is forty-five degrees.

6. The method of claim 3, wherein the substantially non-perpendicular angle is forty-five plus or minus five degrees.

7. The method of claim 3, wherein the substantially non-perpendicular angle is forty-five plus or minus twenty degrees.

8. The method of claim 1, wherein the step of bombardment is performed using an ion beam.

9. The method of claim 1, wherein the step of bombarding the surface further comprises the step of implanting a material into the surface.

10. The method of claim 9, wherein the step of bombarding further comprises the step of bombarding the surface with ions selected from the group of oxygen, nitrogen, carbon, hydrogen, fluorocarbons, hydrocarbons, and chlorine.

11. The method of claim 9, wherein the step of bombarding further comprises the step of bombarding the surface with ions selected from the group of oxygen mixed with a noble gas, nitrogen mixed with a noble gas, carbon mixed with a noble gas, hydrogen mixed with a noble gas, fluorocarbons mixed with a noble gas, and chlorine mixed with a noble gas.

12. The method of claim 9, wherein the step of bombarding is performed at a substantially non-perpendicular angle to the substrate.

13. The method of claim 9, wherein the substantially non-perpendicular angle is between ten and eighty degrees.

14. The method of claim 9, wherein the substantially non-perpendicular angle is forty-five degrees.

15. The method of claim 9, wherein the substantially non-perpendicular angle is forty-five plus or minus five degrees.

16. The method of claim 9, wherein the substantially non-perpendicular angle is forty-five plus or minus twenty degrees.

17. The method of claim 9, wherein the step of bombardment is performed using an ion beam.

18. A method for creating a liquid crystal alignment layer, comprising the steps of:
   aligning a surface of a substrate with a target; and
   bombarding the target, wherein the target emits a material in a direction towards the surface of the substrate and deposits the material on the surface of the substrate, the bombarding step creating the alignment layer and the preferentially oriented bonds therein.

19. An alignment layer, comprising a surface including at least one preferentially oriented bond, wherein the preferentially oriented bond is created by bombardment of the surface, the bombardment having created the layer and the oriented bonds, the layer having a structure without directional surface topography.

20. A liquid crystal display device, comprising:
   a first substrate;
   a first electrode layer, coupled to the first substrate;
   a first alignment layer, coupled to the first electrode layer and the first substrate, wherein the first alignment layer is created by bombardment with a material containing beam, whereby the material containing beam deposits an additional layer of material the layer having, preferentially oriented bonds on the surface;
   a second substrate, disposed a distance away from the first substrate;
   a second electrode layer, coupled to the second substrate;
   a second alignment layer, coupled to the second electrode layer and the first substrate, wherein the second alignment layer is created by bombardment with a material containing beam, whereby the material containing beam deposits an additional layer of material the layer having, preferentially oriented bonds on the surface;
   a liquid crystal, disposed between the first alignment layer and the second alignment layer; and
   a spacer, coupled between the first substrate and the second substrate, for disposing the first substrate by the distance from the second substrate and for containing the liquid crystal between the first alignment layer and the second alignment layer.

\* \* \* \* \*